United States Patent [19]

Allen

[11] Patent Number: 4,497,499
[45] Date of Patent: Feb. 5, 1985

[54] DOUBLE-CAM POWER CHUCK

[75] Inventor: Joseph S. Allen, Indianapolis, Ind.

[73] Assignee: Stace-Allen Chuck, Inc., Indianapolis, Ind.

[21] Appl. No.: 334,633

[22] Filed: Dec. 28, 1981

[51] Int. Cl.³ .......................... B23B 5/34; B23B 5/22; B23B 25/00; B23B 31/12

[52] U.S. Cl. ................. 279/119; 279/1 DA; 279/106; 279/118

[58] Field of Search ............... 279/106, 107, 109, 110, 279/118, 119, 1 DA

[56] References Cited

U.S. PATENT DOCUMENTS

| | | | |
|---|---|---|---|
| 2,722,427 | 11/1955 | Labeyrie | 279/119 |
| 2,736,563 | 2/1956 | Work | 279/1 DA |
| 2,758,843 | 8/1956 | Coulson | 279/119 |
| 2,767,994 | 10/1956 | Gamet | 279/119 |
| 3,365,206 | 1/1968 | Hohwart et al. | 279/106 |
| 3,404,896 | 10/1968 | Stace et al. | 279/119 |
| 3,433,491 | 3/1969 | Longuski et al. | 279/106 |
| 3,468,550 | 9/1969 | Platt et al. | 279/119 |
| 3,604,717 | 9/1971 | Hohwart | 279/106 |
| 4,262,410 | 4/1981 | Roberts | 279/118 |

Primary Examiner—Paul A. Bell
Assistant Examiner—Paul M. Heyrana, Sr.
Attorney, Agent, or Firm—Barnes & Thornburg

[57] ABSTRACT

A chuck with radially reciprocating jaws is disclosed wherein each jaw is supported on a jaw support member movable relative to a base. An actuator is axially disposed in the base for axial reciprocation, the actuator having pivotally connected first and second links which extend radially from the actuator to engage the jaw support member. An eccentric cam connects each of the links to the jaw support member so as to translate the axial motion of the actuator into radial motion of the jaw member. One of the eccentrics has a fixed defined axis with respect to the base, while the other eccentric is received in bushings which are axially slidable with respect to the base.

15 Claims, 6 Drawing Figures

DOUBLE-CAM POWER CHUCK

The present invention relates generally to chucks having lever-actuated, radially reciprocating jaws. More particularly, the present invention relates to such chucks in which the jaw members are moved axially as well as radially so as to grip the workpiece as it is loaded into the chuck and pull it toward stops in the face thereof.

In U.S. Pat. No. 3,404,896, there were disclosed two chucks of the same general class as the present invention. Each chuck included a base and a plurality of jaw members radially arranged about an axis of the base, the jaw members being radially movable relative to the axis of the base. An actuator was provided for simultaneously operating all of the jaw members. The actuator employed a jaw support which supported each jaw member, the jaw support acting as a cam follower. A cam was provided which cooperated with the jaw support, the cam being rotatably supported in the chuck base. A linkage member was provided for rotating the cam. The linkage member was in turn pivotally connected to a draw bar which was movable axially with respect to the base. As the draw bar moved axially, the link pivotally connected thereto caused rotation of the cam which in turn caused the desired motion of the jaw support member.

To lock the jaw support member effectively, it was necessary to provide a wedge which acted against the jaw supports so as to force the jaw supports either radially inwardly or radially outwardly, thereby lockingly engaging the workpiece. The wedge was disposed on the axially reciprocal jaw bar so as to provide simultaneous action with the camming function of the apparatus. Structural limitations were such that a chuck could only perform a gripping function in one radial direction. That is, a chuck could be constructed in accordance with U.S. Pat. No. 3,404,896 for either inside gripping or outside gripping of a workpiece, but not both. It is therefore an object of the present invention to provide a chuck having lever-actuated radially reciprocating jaws which are capable of engaging a workpiece on either an inside or an outside surface of the workpiece.

A chuck of the present invention includes a base rotatable about an axis of rotation having an actuator axially disposed in the base for axial reciprocation. A plurality of first and second links are pivotally connected to the actuator, the links extending substantially radially from the actuator. A like plurality of jaw support members are arranged circumferentially about the axis of the base, the jaw supports being movable radially with respect thereto, each jaw support receiving a first and a second link. Eccentric means are provided connecting each of the links to the jaw support members for translating the axial motion of the actuator into both radial and axial motion of the jaw members.

In particular, a chuck of the present invention includes a front housing fixed to the rotatable base for rotation therewith. First eccentric means connecting the first links to the jaw support members are received for rotation relative to the front housing. A plurality of bushings are provided which are axially slidably received in the base. The plurality of axially slidable bushings in turn receive the eccentrics connecting the second links to the jaw supports.

The eccentric means generally comprise a floating gudgeon cam in the form of a right circular cylinder having a hole therethrough normal to the axis of the cylinder. The hole receives a radially outward end of one of the links. Two cylindrical trunnions are provided, one on each planar face of the right circular cylinder forming the floating gudgeon cam. The two trunnions are coaxial with respect to each other, but offset from the axis of the right circular cylinder forming the cam.

The axially slidable bushings received in the base each can comprise a major chordal section of a right circular cylinder having a cylindrical hole therein normal to the chordal section face for receiving a pivot of the eccentric means.

Each of the first links is pivoted about a first pivot point such that during the axial reciprocation of the actuator, the first pivot point traverses a plane defined by the axes of the eccentric means connected thereto. The second links are pivoted about a second pivot point rearwardly displaced from the first pivot point, yet positioned such that during the axial reciprocation of the actuator the second pivot point remains axially forward of the plane defined by the axes of the eccentric means connected thereto.

Various other structural features and functional advantages of the present invention will become apparent to those skilled in the art upon consideration of the accompanying drawings illustrating the invention and showing a preferred embodiment exemplifying the best mode of carrying out the invention as presently perceived. In such drawings.

Figure 1:
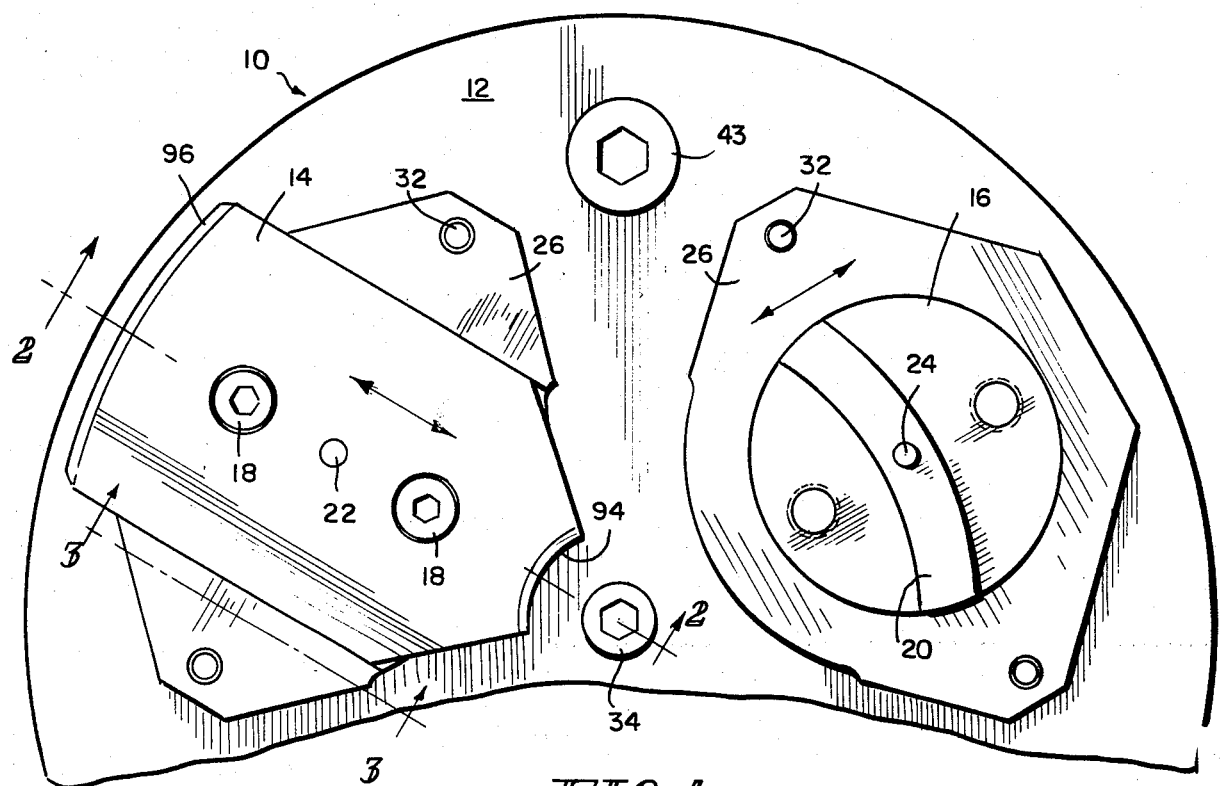
FIG. 1 is a front elevation view of the upper portion of a chuck of the present invention.
Figure 4:
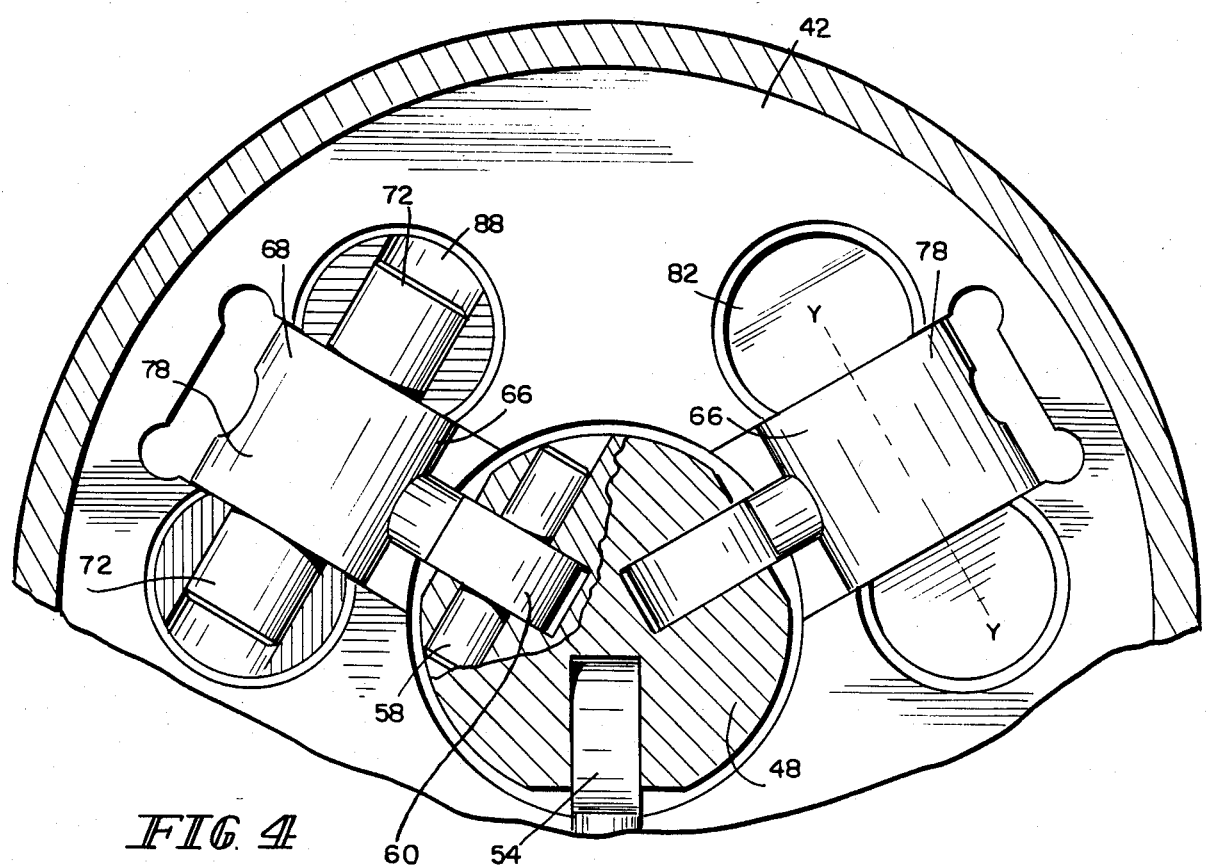
FIG. 4 is a sectional view of the chuck taken along lines 4—4 as shown in FIG. 3.

A chuck 10 of the present invention includes a front housing 12 with a plurality of circumferentially spaced jaws 14 which are radially and axially displaceable with respect to front housing 12. The jaws 14 are secured to jaw supports 16 by threaded fasteners 18. The jaws 14 are positioned with respect to the jaw supports 16 by means of an arcuate land 20 existing in the face of jaw support 16 and a corresponding arcuate groove existing on the surface of jaw 14 contacting jaw support 16. A locating pin 22 can also be employed to ensure accurate circumferential positioning of jaw 14, the pin 22 being received in an appropriate hole 24 in land 20 of jaw support 16. Each of the jaw supports 16 are surrounded by a seal 26 which is adapted to move radially with jaw support 16 relative to front housing 12. The seal 26 includes a first O-ring 28 between seal 26 and jaw support 16 and a second O-ring 30 between seal 26 and front housing 12. The seals 26 are maintained in position by spring-loaded standoffs 32 in a manner similar to that shown in U.S. Pat. No. 3,404,896. One or more stops 34 can be provided to axially automatically gauge the positioning of a workpiece with respect to chuck 10.

A front housing cover 36 surrounds the outside of front housing 12 and is sealed in place by means of front sealing ring 38 and rear sealing ring 40. The rear sealing ring 40 contacts not only front housing 12 and front housing cover 36, but also back housing or base 42 which is supported with the rest of the chuck 10 by appropriate screw means 43 on a lathe or other machine tool 44. The base includes a hole 46 centered about the axis of rotation X—X. In hole 46 is situated an actuator 48 which is axially reciprocal with respect to base 42. A seal ring 50 is provided to ensure a seal between base 42 and actuator 48. A plurality of forward links 52 and rearward links 54 are pivotally connected to actuator 48 by pivot pins 56 and 58, respectively. The radially inner portions 60 of links 52 and 54 are received in an axially elongated slot 62 in actuator 48, the number of such slots 62 being equal to the number of jaws 14 in the chuck 10. The links 52 and 54 extend substantially radially outward from actuator 48 and are received within jaw support 16. The radially outer portions 64 of links 52 and 54 are received within eccentrics 66.

Each eccentric can be viewed as a floating gudgeon cam in the form of a right circular cylinder 68 having a hole 70 passing through cylinder 68 normal to the axis Y—Y of the cylinder. A trunnion 72 is positioned on each planar face 74 of cylinder 68, the two trunnions 72 being coaxial with each other but offset from axis Y—Y of the cylinder body 68. The trunnions 72 of each front eccentric 74 are received in bushings 76 which are fixed in front housing 12. The trunnions 72 of each rear eccentric 78 are received in rear bushings 80 which are axially slidably received in bushing chambers 82 in base 42. The rear bushings 80 have a cylindrical surface 84 which is interrupted by a planar surface 86 which constitutes a chord of the cylindrical surface 84. Thus, the bushing 80 may be viewed as a major chordal section of a right circular cylinder with a cylindrical hole 88 normal to planar surface 86 for receiving trunnion 72.

The cylindrical surface of eccentrics 66 are received in cylindrical apertures 90 which extend normal to a radial direction through jaw support members 16. An axially elongated radial slot 92 in jaw support 16 receives the radialy outward portions 64 of links 52 and 54 so that they might be received in holes 70 of eccentrics 66.

Figure 2:
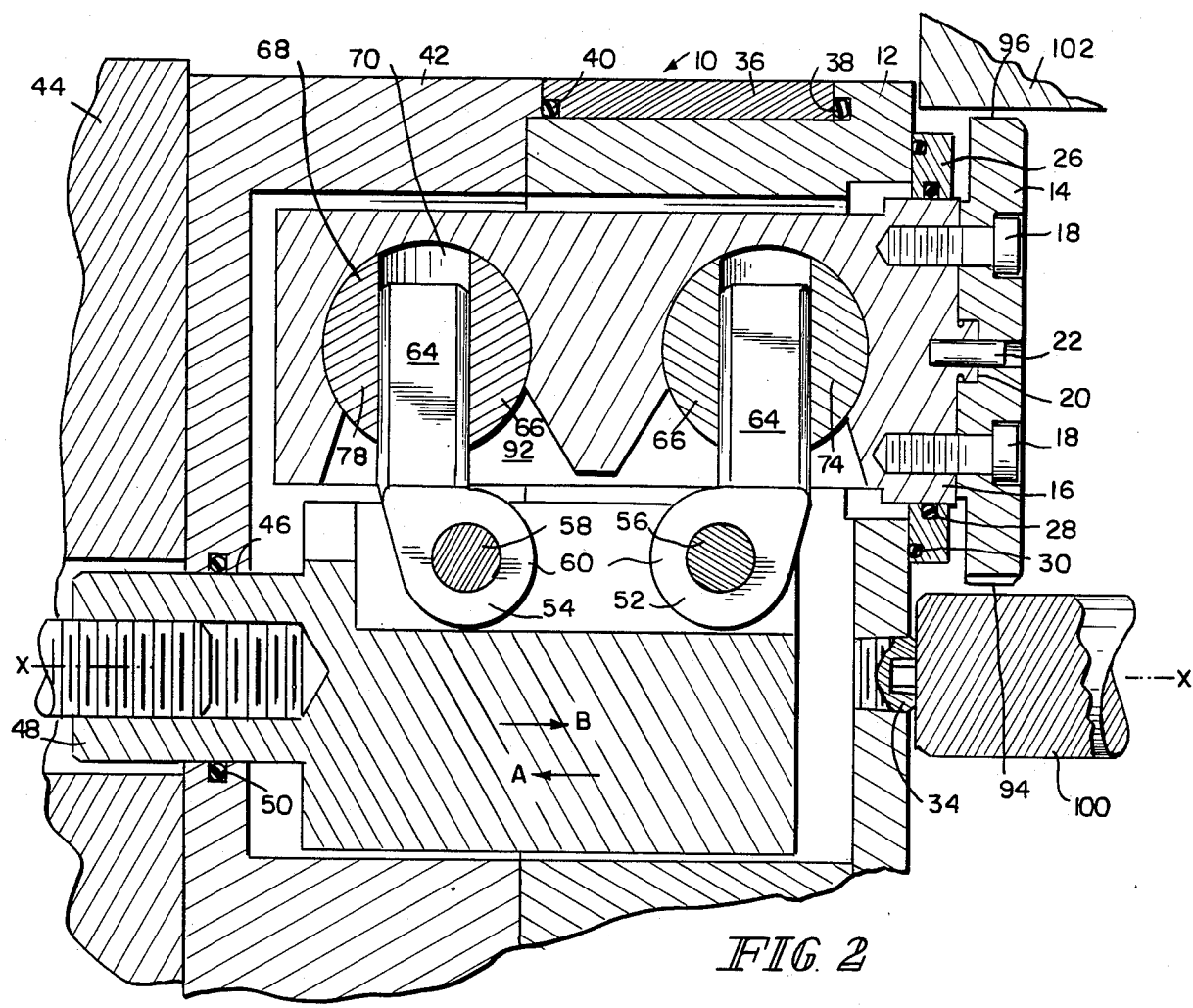
FIG. 2 is a sectional view of the chuck shown in FIG. 1, taken along lines 2—2.

In operation, the jaws 14 can be caused to move either radially outward or radially inward so as to grip a workpiece. When it is desirable to grip the outside of a workpiece 100 with the radial inner face 94 of jaw 14, the actuator 48 is moved in the direction A as shown in FIG. 2, thus causing the clockwise rotation of eccentrics 66 about the axis defined by trunnions 72. This causes jaw support 16 to move radially inwardly and axially toward front housing 12, thereby gripping the workpiece 100 and pulling it toward stop 34. Likewise, if it is desirable to grip an inside surface of workpiece 102 with jaw face 96, actuator 48 is axially moved in direction B, thereby causing a counterclockwise rotation of eccentrics 66 about the axis of trunnions 72 which in turn causes the radially outward motion of jaws 14 together with the motion toward front housing 12 again in an arcuate fashion, thereby gripping and pulling the workpiece 102 toward an appropriate stop (not shown) on chuck 10.

Figure 3:
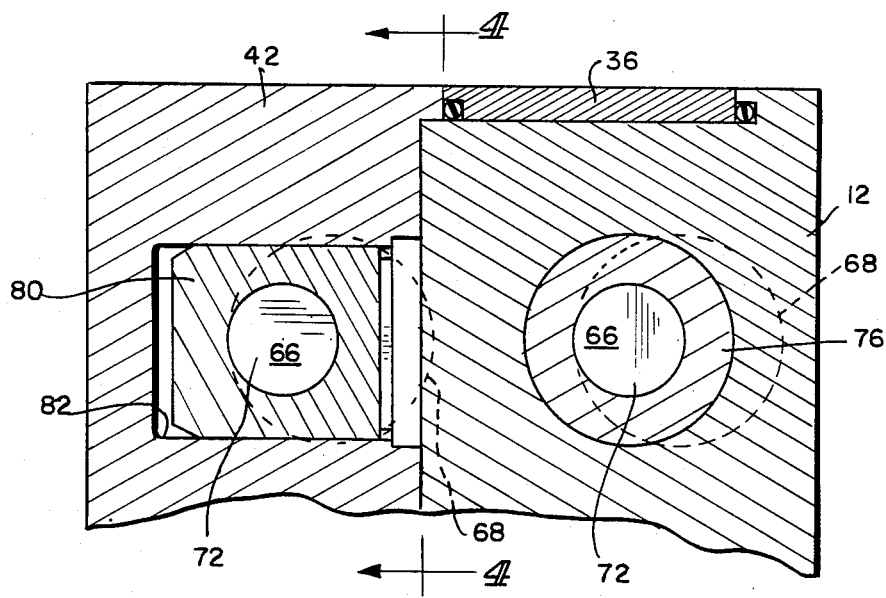
FIG. 3 is a further sectional view of the chuck shown in FIG. 1, taken along section lines 3—3.
Figure 5:
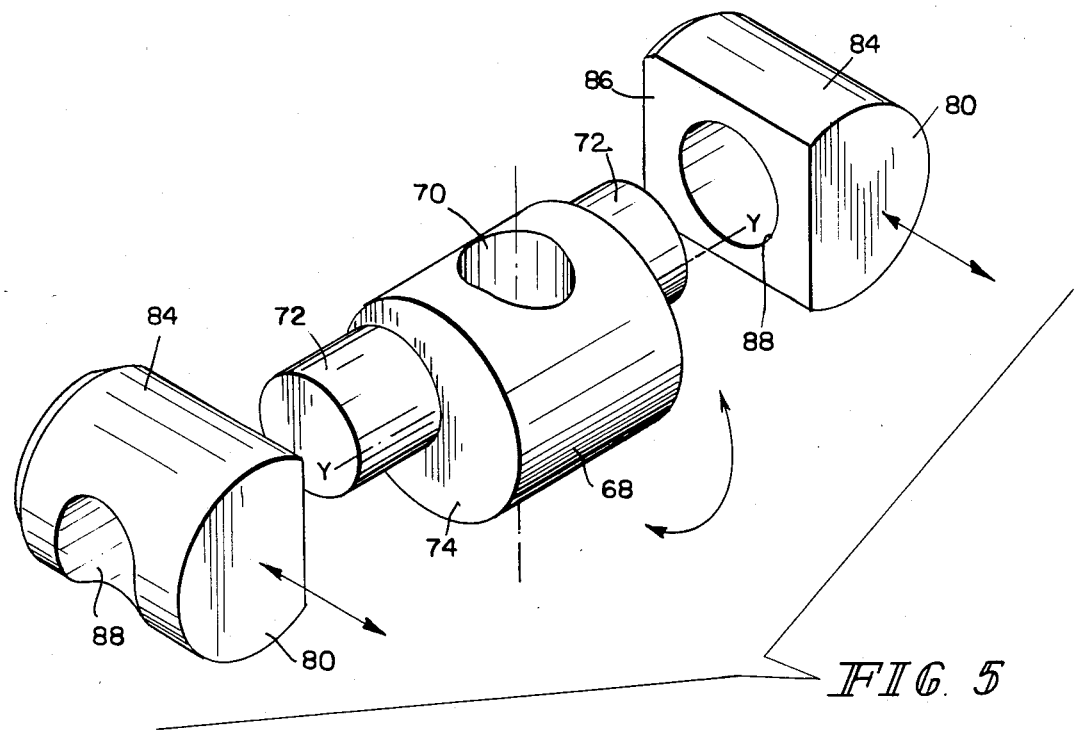
FIG. 5 is an exploded isometric view of a floating gudgeon cam and a pair of the axially slidable bushings which would support that cam.
Figure 6:
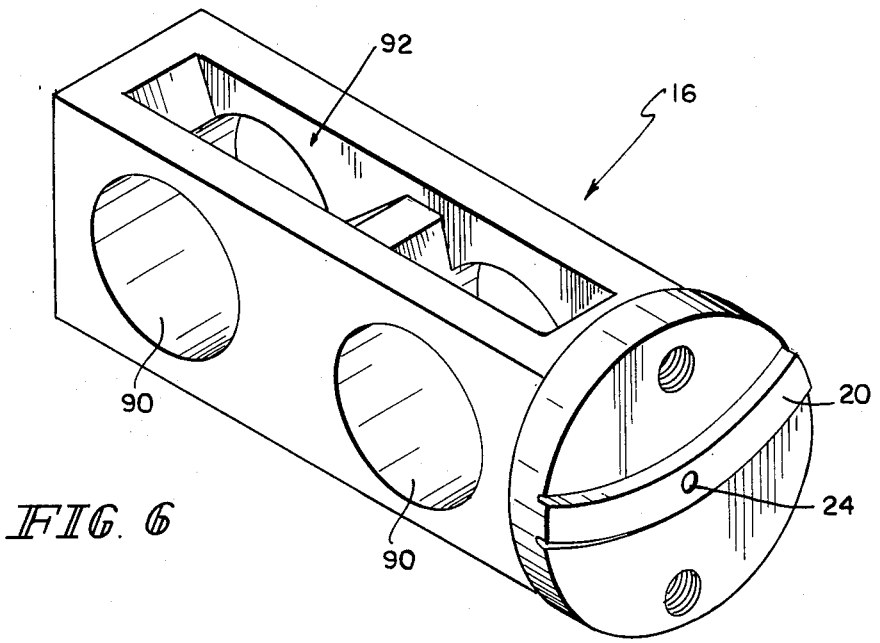
FIG. 6 is an isometric view of a jaw support member with the radially inward surface of the jaw support member shown on top.

It is important to note that during the axial reciprocation of actuator 48, the pivot point of forward link 52 about pivot 56 traverses a plane defined by the center of rotation of the trunnions of the associated forward eccentric 66. On the other hand, the pivot point of rear link 54 about pivot 58 at all time remains forward of the axis of rotation of trunnion 72 of the associated rear eccentric. Further, the pivot of forward link 52 is somewhat behind the outward radial extension 64 of that link, whereas the pivot point of rear link 54 is somewhat ahead of the radial extension 64 of that link. Finally, the axial motion of actuator 48 and consequent rotation of rear gudgeon cam 66 causes the bushings 80 to move axially as shown in FIGS. 3 and 5 by a small dimension sufficient to offset the difference in angular rotation experienced by the forward and rearward eccentrics 66. The axially movable bushings 80 also aid significantly in simplifying the manufacture and assembly of the chuck 10 and also permits a reduction in overall thickness dimension of the chuck by eliminating the need for exact parallel motion of links 60. While the present invention has been described in detail in reference to the accompanying figures, other variations will be apparent to those skilled in the art which are within the scope of the appended claims which define the invention.

I claim:

1. A chuck, comprising a base
rotatable about an axis of rotation, an actuator axially disposed in the base for axial reciprocation relative thereto,
a plurality of first links, each first link including a distal member axially offset in a first direction and pivotally connected to the actuator, a like plurality of second links, each second link including a distal member axially offset opposite the first direction and pivotally connected to the actuator, the distal members of the first and second links extending substantially radially from the actuator,
a like plurality of jaw support members arranged circumferentially about the axis and movable radially relative thereto, each jaw support member receiving a first and a second link therein for relative motion therewith, and
eccentric means connecting the distal members of the first and second links to the jaw support members for translating axial motion of the actuator into radial motion of the jaw members, each first link being pivotable about a first pivot point such that, during axial reciprocation of the actuator, the first pivot point traverses a first plane defined by the pivot axes of the eccentric means connected thereto, and each second link being pivotable about a second pivot point such that, during reciprocation of the actuator, the second pivot point remains axially forward of a second plane defined by the pivot axes of the eccentric means connected thereto.

2. The chuck of claim 1 wherein each pair of first and second links lies in a plane intersecting the axis of rotation.

3. The chuck of claim 1, further comprising a front housing fixed to the base for rotation therewith, the eccentric means connecting the first links to the jaw support members being received for rotation relative to the front housing.

4. The chuck of claim 3, further comprising a plurality of bushings axially slidably received in the base, the bushings in turn receiving the eccentric means connecting the second links.

5. The chuck of claim 4 wherein said bushings each comprise a major chordal section of a right circular cylinder having a cylindrical hole therein normal to the chordal section face for receiving a pivot of said eccentric means.

6. The chuck of claim 1 wherein said actuator includes a like plurality of radially spaced longitudinally extending grooves, each groove receiving one end of each of a first and second link, and pivot pins pinning each link to the actuator for axial movement therewith and rotational movement relative thereto.

7. The chuck of claim 1 wherein each first link is pivoted about a first pivot point such that, during the axial reciprocation of the actuator, the first pivot point traverses a first plane defined by the axes of the eccentric means connected thereto, and wherein each of said second links is pivoted about a second pivot point such that, during the axial reciprocation of the actuator, the second pivot point remains axially forward of a second plane defined by the axes of the eccentric means connected thereto.

8. The chuck of claim 1 wherein each jaw support member comprises an axially elongated bar having an axially elongated radial slot therein for receiving a radially outward end of a first and a second link.

9. The chuck of claim 8 wherein each jaw support member includes a pair of circular apertures normal to said axially elongated radial slot, the apertures receiving said eccentric means.

10. The chuck of claim 1 wherein each eccentric means comprises a floating gudgeon cam in the form of a right circular cylinder having a hole therethrough normal to the axis of the cylinder for receiving the distal member of one of said links, and two cylindrical trunnions, one trunnion on each planar face of the right circular cylinder, the two trunnions being coaxial with respect to each other but offset from the axis of the right circular cylinder defining the cam surface.

11. A chuck, comprising a base rotatable
about an axis of rotation, an actuator axially disposed in the base for axial reciprocation relative thereto,
a plurality of first links pivotally connected to the actuator, a like plurality of second links pivotally connected to the actuator, the first and second links extending substantially radially from the actuator, each first link including a distal portion axially offset in a first direction, and each second link including a distal portion axially offset in a second direction,
a like plurality of jaw support members arranged circumferentially about the axis and movable radially relative thereto, each jaw support member receiving the distal portion of a first and a second link therein for relative motion therewith, and
eccentric means connecting the links to the jaw support members for translating axial motion of the actuator into radial motion of the jaw members, each first link being pivotable about a first pivot point such that, during axial reciprocation of the actuator, the first pivot point traverses a first plane defined by the pivot axes of the eccentric means connected thereto, and each second link being pivotable about a second pivot point such that, during reciprocation of the actuator, the second pivot point remains axially forward of a second plane defined by the pivot axes of the eccentric means connected thereto.

12. A chuck, comprising a base rotatable
about an axis of rotation, an actuator axially disposed in the base for axial reciprocation relative thereto,
a plurality of first links pivotally connected to the actuator at a first pivot point, a like plurality of second links pivotally connected to the actuator at a second pivot point, the first and second links including distal portions extending substantially radially from the actuator, the second pivot point being axially rearwardly displaced along the actuator in relation to the first pivot point, the distal portion of each first link being axially offset from the first pivot point in a first direction, the distal portion of each second link being axially offset from the second pivot point opposite the first direction,
a like plurality of jaw support members arranged circumferentially about the axis and movable radially and axially relative thereto, each jaw support member receiving a first and a second link, each jaw support including a surface adapted to receive a jaw generally perpendicularly to the axis of rotation,
first eccentric means connecting the distal portion of the first links to the jaw support members for translating axial motion of the actuator into radial and axial motion of the jaw support members, and
second eccentric means connecting the distal portion of the second links to the jaw support members for translating axial motion of the actuator into radial and axial motion of the jaw support members, the faces of the jaw support members being maintained parallel through the cooperative movement of the first and second eccentric means by the first and second links.

13. The chuck of claim 12 wherein each first and second eccentric means comprises a floating gudgeon cam in the form of a right circular cylinder having a hole therethrough normal to the axis of the cylinder for receiving the distal portion of one of said links, and two cylindrical co-axial trunnions, one trunnion on each planar face of the first circular cylinder, and wherein a first plane is defined by the pivot axes of the trunnions of the first eccentric means, and wherein a second plane is defined by the pivot axes of the trunnions of the second eccentric means.

14. The chuck of claim 13 wherein each first link is pivoted about a first pivot point such that, during the axial reciprocation of the actuator, the first pivot point traverses said first plane and wherein each of said second links is pivoted about a second pivot point such that, during the axial reciprocation of the actuator, the second pivot point remains axially forward of said second plane.

15. A chuck, comprising a base rotatable about an axis of rotation,
a housing fixed to the base for rotation therewith,
an actuator axially disposed in the base for axial reciprocation relative thereto,
a plurality of first links pivotally connected to the actuator, each first link including a distal member axially offset in a first direction, a like plurality of second links pivotally connected to the actuator, each second link including a distal member axially offset opposite the first direction, the distal members of the first and second links extending substantially radially from the actuator,
a like plurality of jaw support members arranged circumferentially about the axis and movable radially relative thereto, each jaw support member receiving a first and a second link therein for relative motion thereby,
eccentric means connecting the distal members of the first and second links to the jaw support members for translating axial motion of the actuator into radial motion of the jaw members, first bushing means fixed to the housing for supporting the eccentric means connectng the first links to the jaw support members, and second bushing means axially slidably received in the base for supporting the eccentric means connecting the second links to the jaw support members.

* * * * *

UNITED STATES PATENT AND TRADEMARK OFFICE
CERTIFICATE OF CORRECTION

PATENT NO.   :   4,497,499

DATED        :   February 5, 1985

INVENTOR(S)  :   Joseph S. Allen

It is certified that error appears in the above-identified patent and that said Letters Patent is hereby corrected as shown below:

In claim 2, line 1, after "claim", replace "1" with --15--.

In claim 7, line 1, after "claim", replace "1" with --15--.

Signed and Sealed this

Twenty-eighth Day of May 1985

[SEAL]

Attest:

DONALD J. QUIGG

*Attesting Officer*    *Acting Commissioner of Patents and Trademarks*